(No Model.)

A. R. SAUTERS.
BEARING FOR CLOTHES WRINGERS.

No. 525,722. Patented Sept. 11, 1894.

ATTEST.
R. B. Moser
G. L. Schaeffer

INVENTOR.
Anthony R. Sauters.

By H. J. Fisher. ATTORNEY.

UNITED STATES PATENT OFFICE.

ANTHONY R. SAUTERS, OF CLEVELAND, OHIO.

BEARING FOR CLOTHES-WRINGERS.

SPECIFICATION forming part of Letters Patent No. 525,722, dated September 11, 1894.

Application filed May 23, 1894. Serial No. 512,193. (No model.)

*To all whom it may concern:*

Be it known that I, ANTHONY R. SAUTERS, a citizen of the United States, residing at Cleveland, in the county of Cuyahoga and State of Ohio, have invented certain new and useful Improvements in Bearings for Clothes-Wringers; and I do hereby declare that the following is a full, clear, and exact description of the invention, which will enable others skilled in the art to which it appertains to make and use the same.

My invention relates to bearings for clothes wringers, and the invention consists in a clothes wringer constructed and operating substantially as shown and described and particularly pointed out in the claim.

Figure 1:
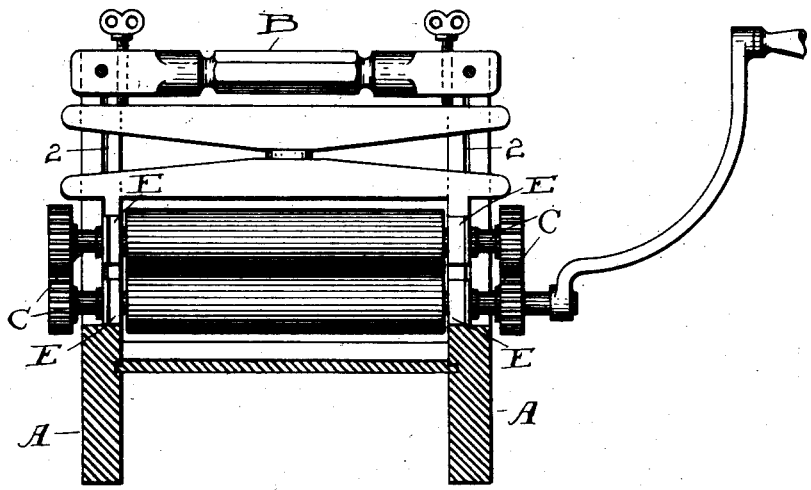
Figure 2:
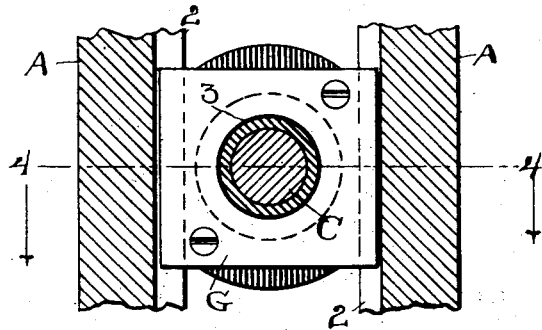
Figure 3:
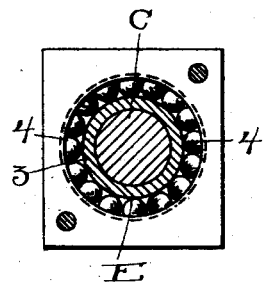
Figure 4:
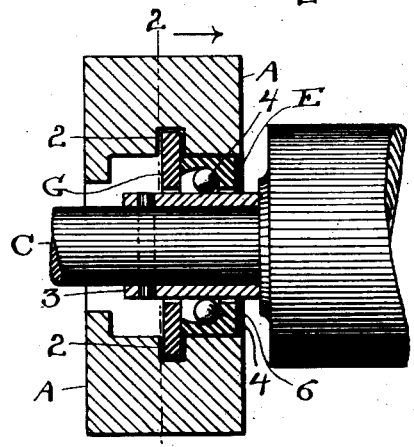
Figure 5:
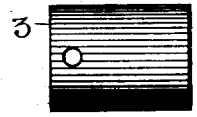

In the accompanying drawings, Figure 1 is a vertical central sectional elevation of the wringer, taken substantially on the axis of the two rollers and showing the relation of the parts to one another. Fig. 2 is an enlarged vertical central section of a sectional part of the wringer frame and parts on a line corresponding to 2, 2, Fig. 4. Fig. 3 is a view of the ball bearing, and a cross-section of the shaft and sleeve through the same and the guide-plate for the bearing removed. Fig. 4 is a cross-section on line 4, 4, Fig. 2, the shaft, however, being shown entire. Fig. 5 is a plain elevation of the bearing sleeve.

The point of the invention is to improve the operation of wringers so as to make their operation more easy than ordinarily, and thus relieve hand labor in turning them. I am of course aware that ball bearings for like purposes in other machines and devices are not broadly new, and that their function and use generally is to relieve friction and promote easy bearings, but my invention comprises the ball bearing in a novel construction of bearing and one which is deemed exceedingly simple and comparatively cheap as well as durable and serviceable.

In the drawings, A represents the side standards of the frame of the wringer, and B the top cross-bar thereof, and this frame may be of any well-known pattern or style, there being no claim for novelty particularly in the frame itself, except as it is modified or changed to adapt my invention thereto.

Referring to Fig. 4, it will be seen that the standards A have central vertical grooves —2— therein, and the shafts C and C of the rollers pass between these standards and have their bearings confined and guided in these grooves or channels. Each shaft is provided with a sleeve or collar —3—, shown in elevation in Fig. 5, and fitting snugly upon the shaft and secured thereto by a screw or its equivalent which make the sleeve and shaft practically one so far as the operation of the wringer is concerned.

It is well-known to those who are experienced in this art that wringers are constantly shrinking and expanding under the wetting they receive in use and their drying when not in use, and the sleeve —3— is of sufficient length to compensate for such expansion and contraction. Furthermore the shaft C is made of apparently soft iron and with friction balls —4— of sufficient hardness to endure the wear, it would soon occur that a groove would be worn into the shaft and the efficiency of the anti-friction balls would be impaired or destroyed. Hence I make the sleeve —3— of steel hardened sufficiently to endure the protracted and severe wear to which they are subject under the anti-friction balls. These balls are placed in an internal channel in the bearing block E, the said channel having a lateral opening at one side which enables the balls to be introduced about the thimble or sleeve —3— before all the parts are put together, and a flange or wall —6— extends down upon the opposite side of said bearing to the sleeve —3—. To introduce the balls it is necessary to turn the bearing block E upon its side with the flange —6— down, then insert the sleeve —3— and let the upper edge thereof extend just high enough in the said block to enable the balls to be inserted about it, and so that it will serve to confine the balls about the inside. Then having introduced the balls the sleeve is pushed up and the guide plate G fixed to block E by screws, as seen in Fig. 2. The parts are now united and are placed together upon the shaft C and the sleeve 3 is rigidly fixed to said shaft. Then the shaft with its bearings is introduced into the frame of the wringer and the guide-plate G is sufficiently wider than the bearing block E to extend into the grooves or channels —2— at the side of said block and serve as guides for the shaft.

Each shaft is furnished with its own bearings, and these bearings are constructed alike and are together introduced into the frame and are far enough apart upon the shafts C,
5 C, not to interfere with the action of the rollers. The pressure from the tightening mechanism for the rollers is brought to bear upon the bearings of the top roller and said mechanism is tightened as the work may require
10 in the usual way.

Having thus described my invention, what I claim is—

The wringer frame, in combination with the roller shaft and the horizontal sleeves fixed thereon to take the wear, the bearing block having a groove about its inside for anti-friction balls, the anti-friction balls in said groove, and the plate G confining said balls, and flanges extending laterally from said plate and engaging in the guide ways in the wringer frame, substantially as set forth.

Witness my hand to the foregoing specification.

ANTHONY R. SAUTERS.

Witnesses:
H. T. FISHER,
GEORGIA SCHAEFFER.